US012714182B2

(12) United States Patent
Grundman et al.

(10) Patent No.: US 12,714,182 B2
(45) Date of Patent: Aug. 25, 2026

(54) ELECTRICITY GENERATING SHOE ASSEMBLY

(71) Applicants: Robert Grundman, Tucson, AZ (US); Kevron Woods, Tucson, AZ (US)

(72) Inventors: Robert Grundman, Tucson, AZ (US); Kevron Woods, Tucson, AZ (US)

( * ) Notice: Subject to any disclaimer, the term of this patent is extended or adjusted under 35 U.S.C. 154(b) by 782 days.

(21) Appl. No.: 17/678,124

(22) Filed: Feb. 23, 2022

(65) Prior Publication Data

US 2023/0263262 A1 Aug. 24, 2023

(51) Int. Cl.

*A43B 3/42* (2022.01)
*H02J 7/70* (2026.01)
*H02J 7/82* (2026.01)
*H02N 2/18* (2006.01)

(52) U.S. Cl.

CPC .................. *A43B 3/42* (2022.01); *H02J 7/70* (2026.01); *H02J 7/82* (2026.01); *H02N 2/18* (2013.01)

(58) Field of Classification Search

CPC ............ A43B 3/42; A43B 3/38; A43B 3/0031
See application file for complete search history.

(56) References Cited

U.S. PATENT DOCUMENTS 5,094,016 A * 3/1992 DiVito ................ A43B 1/0036 36/1
5,500,635 A * 3/1996 Mott .................... H03K 17/964 36/137
D724,013 S 3/2015 Zsolesak
10,512,297 B2 12/2019 Vamvas
2006/0021261 A1 2/2006 Face
2007/0044346 A1* 3/2007 Ungari ............... A43B 23/0235 36/136
2015/0042101 A1 2/2015 Luo
2016/0091186 A1* 3/2016 Chow ...................... A43B 3/38 362/103
2017/0164680 A1 6/2017 Ge
2019/0216162 A1* 7/2019 Gruben .................. H02N 2/183
2020/0068984 A1 3/2020 Sharpes
2020/0177105 A1 6/2020 Wang
2021/0135482 A1* 5/2021 Bica .......................... F03B 7/00
2023/0172307 A1* 6/2023 Schmidt .............. H02J 7/00036 320/108

FOREIGN PATENT DOCUMENTS

CN 109452717 A * 3/2019 ............... A43B 3/00
WO WO2017101364 6/2017

OTHER PUBLICATIONS

Translation of CN-109452717-A (Year: 2019).*

* cited by examiner

*Primary Examiner* — Grady Alexander Nunnery

(57) ABSTRACT

An electricity generating shoe assembly includes an article of footwear that is wearable for walking. A pocket is integrated into the article of footwear at a strategic location to facilitate a user to access the pocket while wearing the article of footwear. A pair generators is each of the generators is integrated into the article of footwear. Each of the generators produce an electrical charge when the generators are alternatively compressed and decompressed as a result of being stepped upon when the article of footwear is worn during walking. A charge unit is integrated into the article of footwear and the generators charge the charge unit when the user is walking. A charge port is integrated into the article of footwear and a charge cord is stored in the pocket in the article of footwear to charge an electronic device.

11 Claims, 4 Drawing Sheets

26
28
14
24
62
58
54
60
64
50

20
32
36
22
44
24
18
46
48
16
40

ELECTRICITY GENERATING SHOE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to electricity generating devices and more particularly pertains to a new electricity generating device for harnessing the energy of walking for charging an electronic device. The device includes an article of footwear and a pair of piezoelectric generators that are integrated into a sole of the article of footwear such that the piezoelectric generators produce an electrical charge from being compressed during walking. The device includes a power supply that is charged by the piezoelectric generators, a charge port recessed into the shoe and a charge cord that can be plugged into the charge port.

(2) Description of Related Art Including Information Disclosed Under 37 CFR 1.97 and 1.98

The prior art relates to electricity generating devices including an article of footwear with an pneumatic generator for producing electricity by way of compression of a sole of the article of footwear. The prior art discloses a piezoelectric generator with is disposed in a chamber within a sole of an article of footwear that includes an armature with is compressed with the sole is stepped upon. The prior art discloses a shoe generator which includes a series of gears that are disposed within an article of footwear, a rack gear which is driven upwardly and downwardly to drive the gears and a generator that is driven by the gears. The prior art discloses a shoe generator which includes an ankle brace, a pulley and belt driven by the ankle brace and a generator driven by the belt. The prior art discloses an article of footwear which has a well extending laterally into a sole of the article of footwear, a cartridge that is insertable into the well and a piezoelectric generator integrated into the cartridge.

BRIEF SUMMARY OF THE INVENTION

An embodiment of the disclosure meets the needs presented above by generally comprising an article of footwear that is wearable for walking. A pocket is integrated into the article of footwear at a strategic location to facilitate a user to access the pocket while wearing the article of footwear. A pair of generators is each of the generators is integrated into the article of footwear. Each of the generators produce an electrical charge when the generators are alternatively compressed and decompressed as a result of being stepped upon when the article of footwear is worn during walking. A charge unit is integrated into the article of footwear and the generators charge the charge unit when the user is walking. A charge port is integrated into the article of footwear and a charge cord is stored in the pocket in the article of footwear to charge an electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
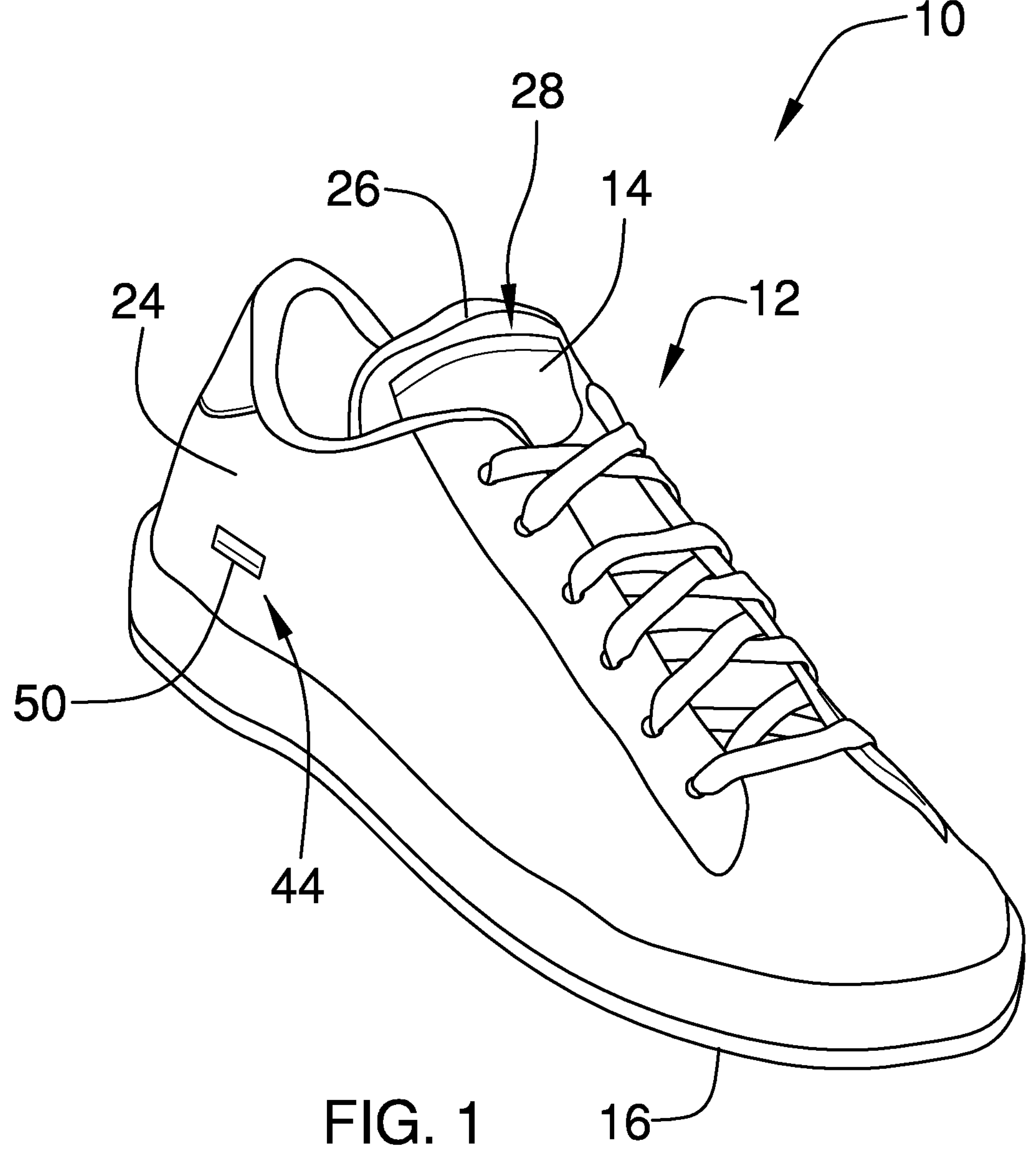
FIG. 1 is a top perspective view of electricity generating shoe assembly according to an embodiment of the disclosure.
Figure 2:
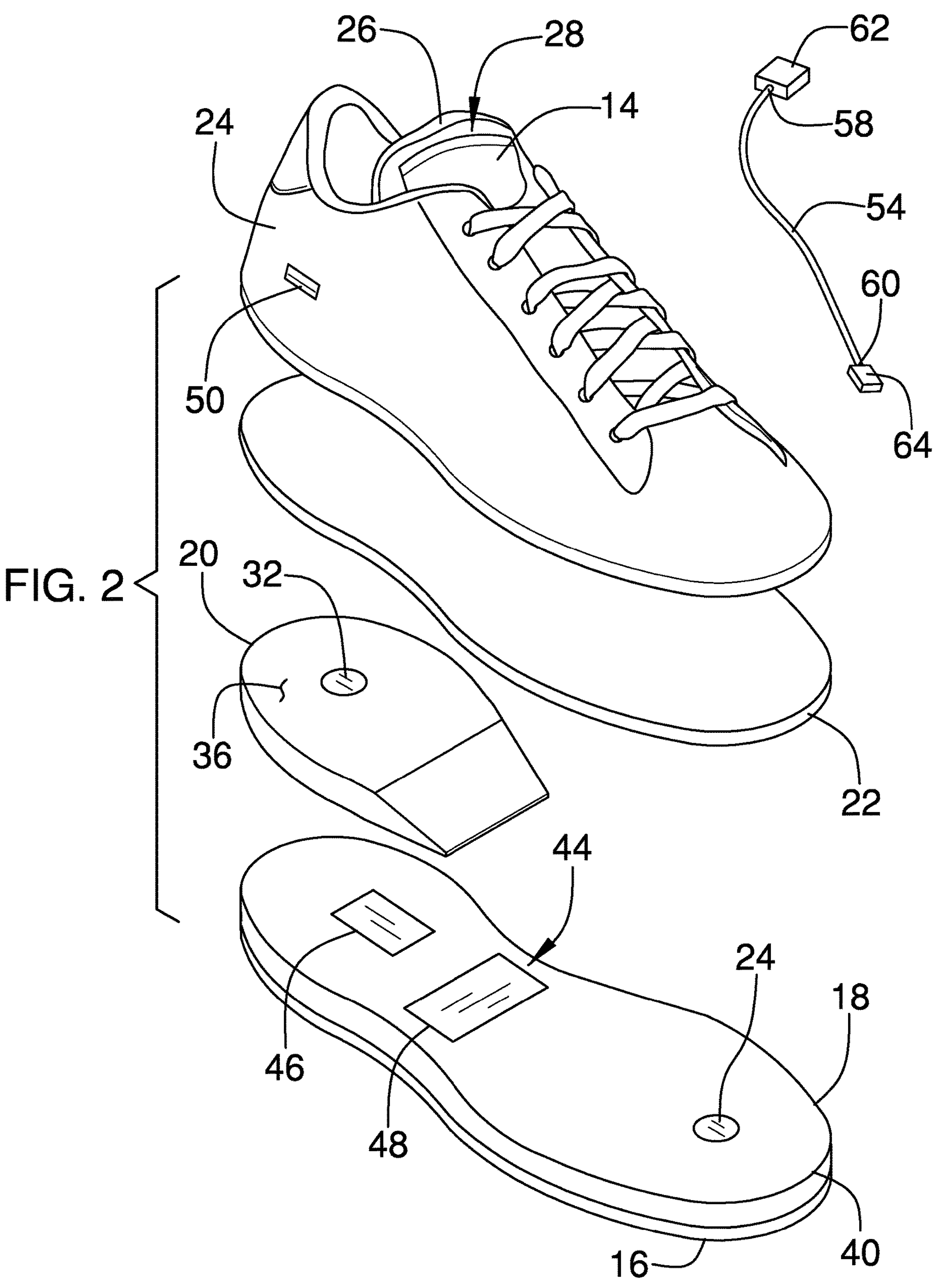
FIG. 2 is an exploded perspective view of an embodiment of the disclosure.
Figure 3:
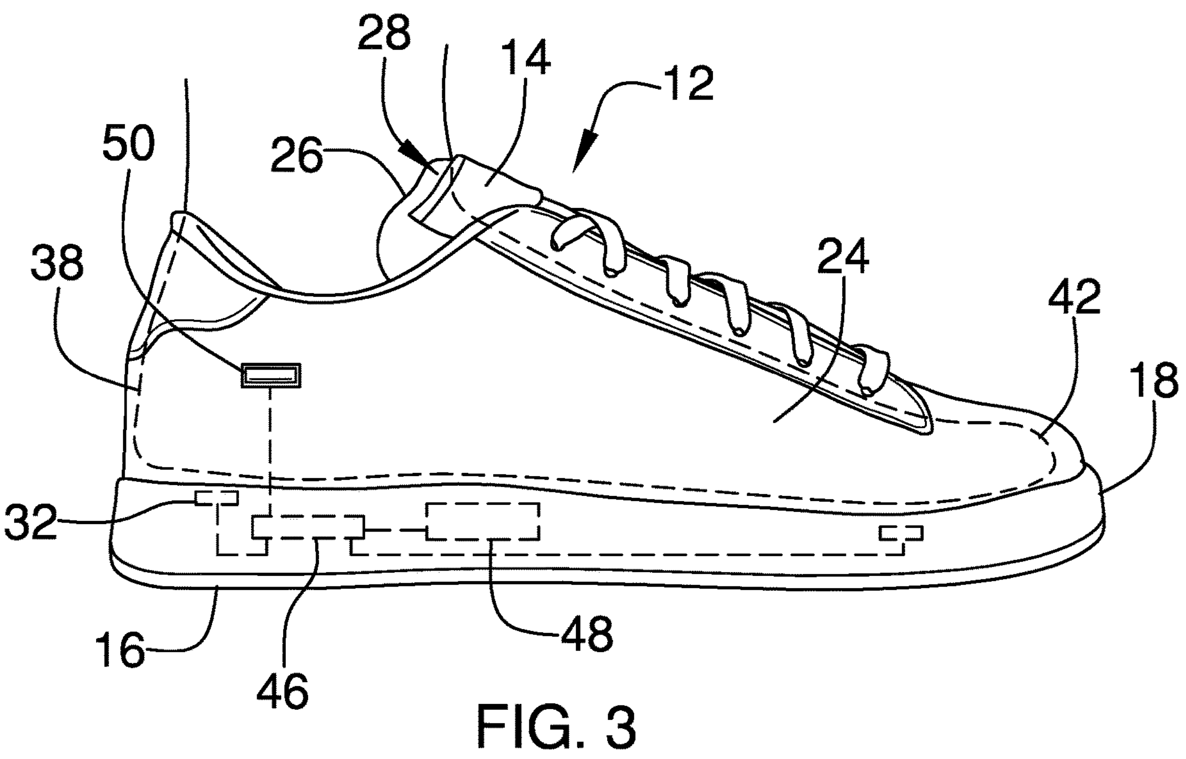
FIG. 3 is a phantom in-use view of an embodiment of the disclosure.
Figure 4:
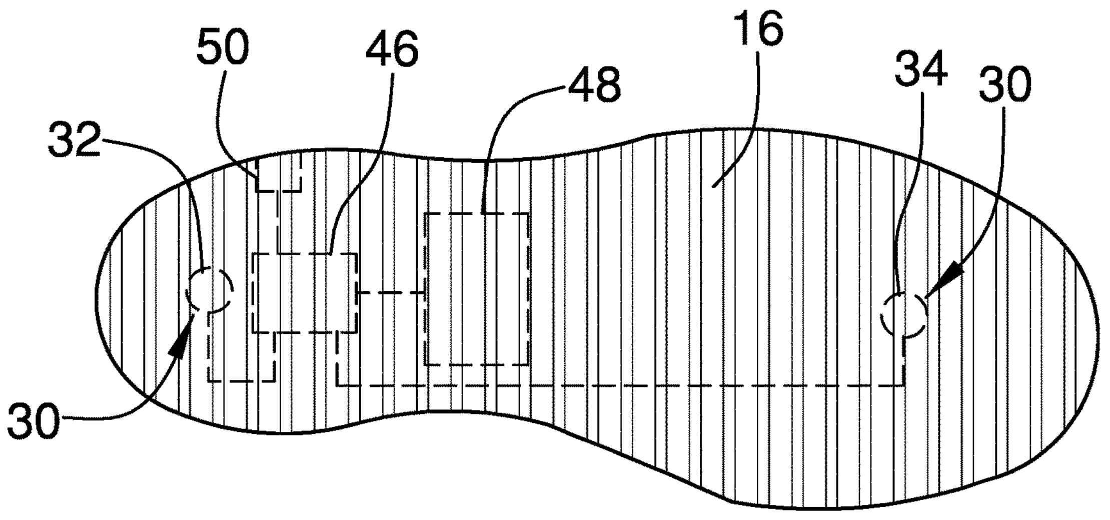
FIG. 4 is a bottom phantom view of an embodiment of the disclosure.
Figure 5:
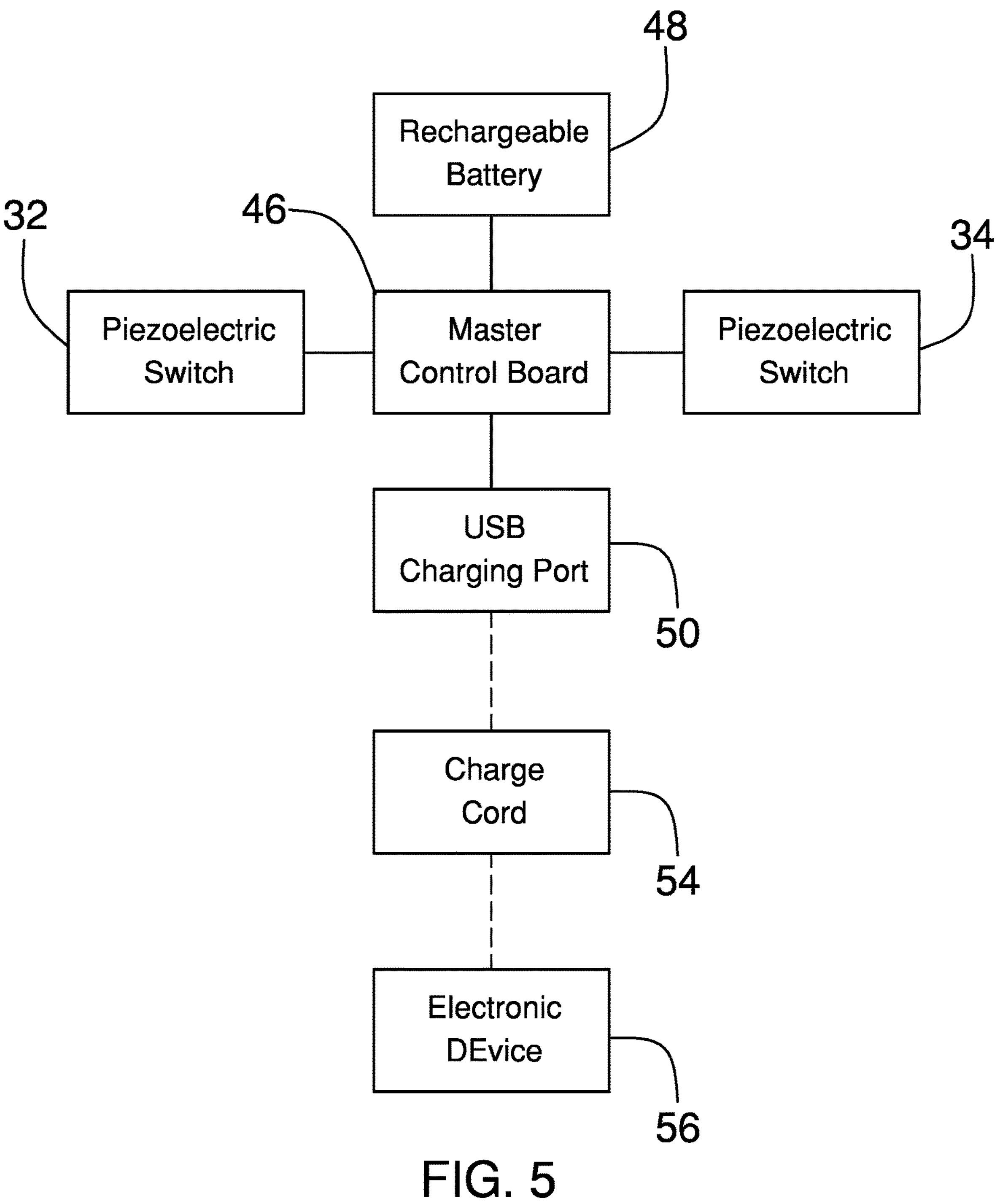
FIG. 5 is a schematic view of an embodiment of the disclosure.

With reference now to the drawings, and in particular to FIGS. 1 through 5 thereof, a new electricity generating device embodying the principles and concepts of an embodiment of the disclosure and generally designated by the reference numeral 10 will be described.

As best illustrated in FIGS. 1 through 5, the electricity generating shoe assembly 10 generally comprises an article of footwear 12 that is wearable for walking. A pocket 14 is integrated into the article of footwear 12 at a strategic location to facilitate the pocket 14 to be accessed while the article of footwear 12 is being worn. The article of footwear 12 has a sole 16, a midsole 18, a heel wedge 20, an insole 22, an upper 24 and a tongue 26. The pocket 14 is integrated into the tongue 26 and the pocket 14 has an entrance 28 extending through an exterior surface of the tongue 26 for accessing an interior of the pocket 14. The article of footwear 12 may comprise a tennis shoe or other similar type of footwear.

A pair of generators 30 is provided and each of the generators 30 is integrated into the article of footwear 12. Each of the generators 30 produces an electrical charge when the generators 30 are alternatively compressed and decompressed. Furthermore, each of the generators 30 is stepped upon when the article of footwear 12 is worn during walking. The pair of generators 30 may comprise a piezoelectric switch which harnesses the piezoelectric effect of producing an electric charge in response to applied mechanical stress.

The pair of generators 30 includes a first generator 32 and a second generator 34. The first generator 32 is integrated into a top surface 36 of the heel wedge 20. In this way the first generator 32 is alternatively compressed and decompressed by a user's heel 38 when the user walks while wearing the article of footwear 12. The second generator 34 is integrated into an upper 24 surface of the midsole 18 and the second generator 34 is positioned proximate a toe 40 of the midsole 18. In this way the second generator 34 is alternatively compressed and decompressed by the user's toes 42 when the user walks while wearing the article of footwear 12.

A charge unit 44 is provided and the charge unit 44 is integrated into the article of footwear 12. The charge unit 44 is in communication with each of the generators 30 thereby facilitating each of the generators 30 to charge the charge unit 44 when the generators 30 are compressed. In this way the charge unit 44 is charged when the user is walking. The charge unit 44 comprises a control circuit 46 that is integrated into the midsole 18. Each of the first generator 32 and the second generator 34 is electrically coupled to the control circuit 46. The control circuit 46 may include circuitry that is common to battery charging circuits.

The charge unit 44 includes a power supply 48 that is integrated into the midsole 18. The power supply 48 is electrically coupled to the control circuit 46 and the control circuit 46 senses a charge level of the power supply 48. The control circuit 46 directs electrical current from the first generator 32 and the second generator 34 into the power supply 48 when the control circuit 46 senses a charge level of the power supply 48 that is less than a trigger charge level. Conversely, the control circuit 46 inhibits electrical current from the first generator 32 and the second generator 34 from being directed into the power supply 48 when the control circuit 46 senses that the charge level of the power supply 48 is at or above a maximum charge level. Furthermore, the power supply 48 comprises a rechargeable battery.

A charge port 50 is integrated into the article of footwear 12 and the charge port 50 is in communication with the charge unit 44. The charge port 50 is recessed into an outside surface 52 of the upper 24 of the article of footwear 12 and the charge port 50 is electrically coupled to the power supply 48. The charge port 50 may comprise a universal serial bus port or other similar type of female charge port. A charge cord 54 is provided and the charge cord 54 is stored in the pocket 14 in the article of footwear 12. The charge cord 54 is pluggable into the charge port 50 such that the charge cord 54 is in communication with the charge unit 44 for charging an electronic device 56.

The charge cord 54 has a first end 58 and a second end 60; a first plug 62 is electrically coupled to the first end 58 and a second plug 64 is electrically coupled to the second end 60. The first plug 62 is matable to the charge port 50 such that the first plug 62 is electrically coupled to the charge port 50 and the second plug 64 is matable to the electronic device. Each of the first plug 62 and the second plug 64 may comprise a universal serial bus port plug or other type of electronic plug common to charging cords for personal electronic devices such as smart phones and the like.

In use, the article of footwear 12 is worn for the conventional purposes of wearing articles of footwear 12. Each of the first generator 32 and the second generator 34 produces an electrical charge while the user walks in the article of footwear 12 to continually charge the power supply 48. The charge cord 54 can be plugged into the charge port 50 at any time for charging an electronic device 56. In this way the electronic device 56 can be charged in any location, regardless of whether electrical power is available. Furthermore, the power supply 48 is continually charged from walking in the article of footwear 12 thereby facilitating a nearly endless supply of electrical power for charging electronic devices.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An electricity generating shoe assembly for generating electricity to charge electronic devices, said assembly comprising:

an article of footwear being wearable for walking, said article of footwear having a pocket being integrated into said article of footwear at a location to facilitate said pocket to be accessed when said article of footwear is being worn, said article of footwear including a tongue, said pocket being integrated into said tongue, said pocket having an entrance extending through an exterior surface of said tongue for accessing an interior of said pocket;

a pair of generators, each of said generators being integrated into said article of footwear, each of said generators producing an electrical charge when said generators are alternatively compressed and decompressed wherein each of said generators is configured to be stepped upon when said article of footwear is worn during walking;

a charge unit being integrated into said article of footwear, said charge unit being in communication with each of said generators thereby facilitating each of said generators to charge said charge unit when said generators are compressed wherein said charge unit is configured to be charged when the user is walking;

a charge port being integrated into said article of footwear, said charge port being in communication with said charge unit; and a charge cord being stored in said pocket in said article of footwear, said charge cord being pluggable into said charge port such that said charge cord is in communication with said charge unit wherein said charge cord is configured to charge an electronic device.

2. The assembly according to claim 1, wherein said article of footwear has a sole, a midsole, a heel wedge, an insole, and an upper.

3. The assembly according to claim 2, wherein:

said pair of generators includes a first generator and a second generator;

said first generator is integrated into a top surface of said heel wedge wherein said first generator is configured to be alternatively compressed and decompressed by a user's heel when the user walks while wearing said article of footwear.

4. The assembly according to claim 3, wherein said second generator is integrated into an upper surface of said midsole, said second generator being positioned proximate a toe of said midsole wherein said second generator is configured and to be alternatively compressed and decompressed by the user's toes when the user walks while wearing said article of footwear.

5. The assembly according to claim 3, wherein said charge unit comprises a control circuit being integrated into said midsole, each of said first generator and said second generator being electrically coupled to said control circuit.

6. The assembly according to claim 5, wherein said charge unit includes a power supply being integrated into said midsole, said power supply being electrically coupled to said control circuit, said control circuit sensing a charge level of said power supply, said power supply comprising a rechargeable battery.

7. The assembly according to claim 6, wherein said control circuit directs electrical current from said first generator and said second generator into said power supply when said control circuit senses a charge level of said power supply that is less than a trigger charge level.

8. The assembly according to claim 6, wherein said control circuit inhibits electrical current from said first generator and said second generator from being directed into said power supply when said control circuit senses that a charge level of said power supply is at or above a maximum charge level.

9. The assembly according to claim 6, wherein said charge port is recessed into an outside surface of said upper of said article of footwear, said charge port being electrically coupled to said power supply.

10. The assembly according to claim 1, wherein said charge cord has a first end and a second end, said charge cord having a first plug being electrically coupled to said first end, said charge cord having a second plug being electrically coupled to said second end, said first plug being matable to said charge port such that said first plug is electrically coupled to said charge port, said second plug being matable to the electronic device.

11. An electricity generating shoe assembly for generating electricity to charge electronic devices, said assembly comprising:

an article of footwear being wearable for walking, said article of footwear having a pocket being integrated into said article of footwear at a location to facilitate said pocket to be accessed when said article of footwear is being worn, said article of footwear having a sole, a midsole, a heel wedge, an insole, an upper and a tongue, said pocket being integrated into said tongue, said pocket having an entrance extending through an exterior surface of said tongue for accessing an interior of said pocket;

a pair of generators, each of said generators being integrated into said article of footwear, each of said generators producing an electrical charge when said generators are alternatively compressed and decompressed wherein each of said generators is configured to be stepped upon when said article of footwear is worn during walking, said pair of generators including a first generator and a second generator, said first generator being integrated into a top surface of said heel wedge wherein said first generator is configured to be alternatively compressed and decompressed by a user's heel when the user walks while wearing said article of footwear, said second generator being integrated into an upper surface of said midsole, said second generator being positioned proximate a toe of said midsole wherein said second generator is configured and to be alternatively compressed and decompressed by the user's toes when the user walks while wearing said article of footwear;

a charge unit being integrated into said article of footwear, said charge unit being in communication with each of said generators thereby facilitating each of said generators to charge said charge unit when said generators are compressed wherein said charge unit is configured to be charged when the user is walking, said charge unit comprising:

a control circuit being integrated into said midsole, each of said first generator and said second generator being electrically coupled to said control circuit; and a power supply being integrated into said midsole, said power supply being electrically coupled to said control circuit, said control circuit sensing a charge level of said power supply, said control circuit directing electrical current from said first generator and said second generator into said power supply when said control circuit senses a charge level of said power supply that is less than a trigger charge level, said control circuit inhibiting electrical current from said first generator and said second generator from being directed into said power supply when said control circuit senses that said charge level of said power supply is at or above a maximum charge level, said power supply comprising a rechargeable battery;

a charge port being integrated into said article of footwear, said charge port being in communication with said charge unit, said charge port being recessed into an outside surface of said upper of said article of footwear, said charge port being electrically coupled to said power supply; and a charge cord being stored in said pocket in said article of footwear, said charge cord being pluggable into said charge port such that said charge cord is in communication with said charge unit wherein said charge cord is configured to charge an electronic device, said charge cord having a first end and a second end, said charge cord having a first plug being electrically coupled to said first end, said charge cord having a second plug being electrically coupled to said second end, said first plug being matable to said charge port such that said first plug is electrically coupled to said charge port, said second plug being matable to the electronic device.

* * * * *